May 31, 1938.   W. S. GURTON ET AL   2,119,460
SEMITRAILER FIFTH WHEEL BRAKE AND ELECTRIC CONNECTION
Filed May 13, 1936   2 Sheets-Sheet 1

Inventors.
William S. Gurton.
Joseph Flint.
Herman Nyberg.

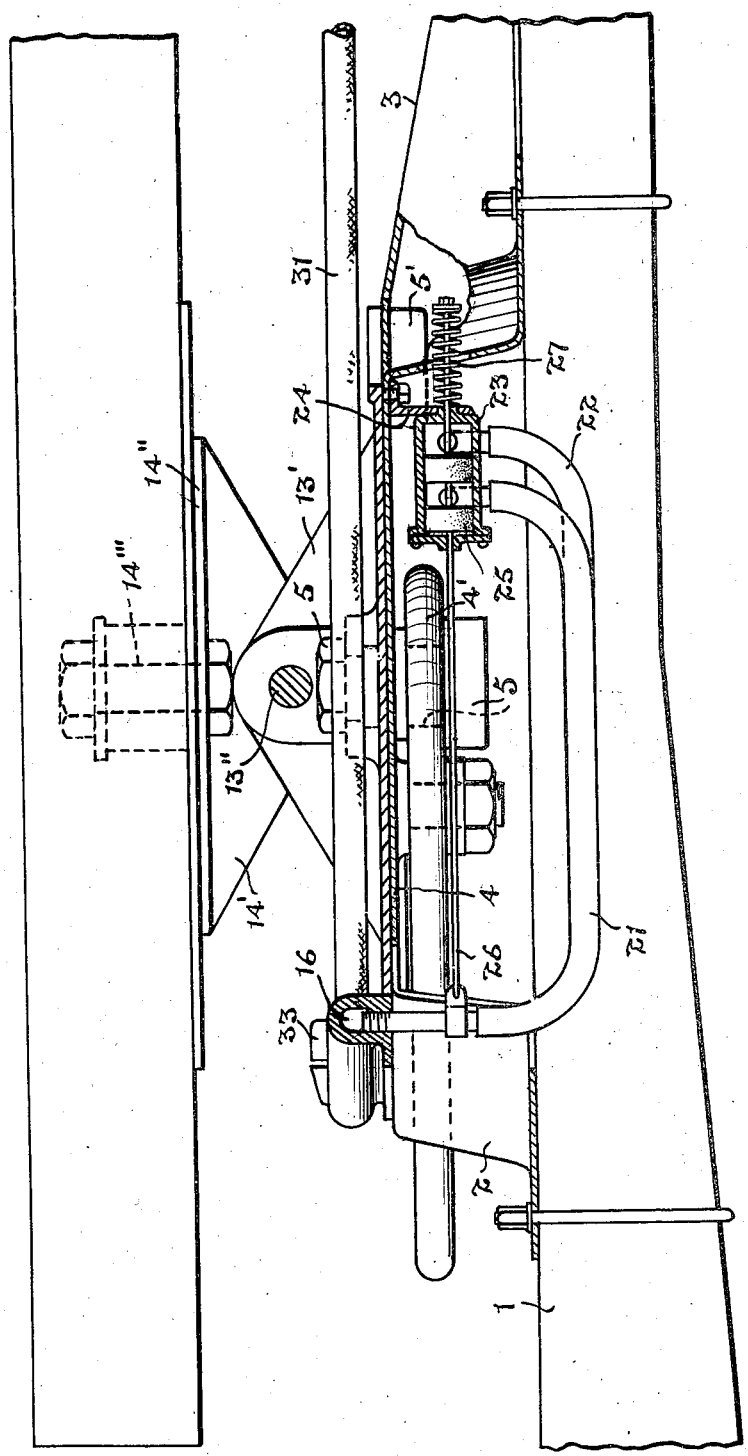

Patented May 31, 1938

2,119,460

UNITED STATES PATENT OFFICE 2,119,460

SEMITRAILER FIFTH WHEEL BRAKE AND ELECTRIC CONNECTION

William S. Gurton, Joseph Plint, and Herman Nyberg, Kitchener, Ontario, Canada, assignors to Dominion Truck Equipment Co., Limited, Kitchener, Ontario, Canada Application May 13, 1936, Serial No. 79,562
In Canada May 14, 1935

4 Claims. (Cl. 280—33.1)

The principal objects of this invention are to provide automatic means for coupling the fluid brake connection between the tractor and trailer member and also to automatically couple the electrical equipment of the trailer with that of the tractor, whereby the inconveniences and uncertainties of manual or independent couplings for either the brake or electrical equipment will be eliminated.

A further and important object is to provide a form of coupling which will be automatically retained securely against leakage irrespective of road conditions and so long as the tractor and trailer remain coupled.

A further and important object is to provide an automatically coupling brake equipment which will ensure the brake equipment of the trailer being always in operating condition when coupled to the tractor.

The principal feature of the invention consists in the novel arrangement of fluid and electrical connections on the trailer connected with their respective systems, and of a co-operative arrangement of fluid and electrical connections flexibly mounted upon the tractor to automatically engage in operative contact with the members on the trailer upon the coupling of the tractor and trailer, and in the provision of means for pressure holding the tractor coupling elements in contact with the trailer elements to maintain a fluid seal and continuous electrical contact with a source of energy on the tractor.

A further and important feature consists in the novel arrangement of means for closing the fluid conduit on the tractor upon the disengaging of the trailer therefrom.

In the accompanying drawing, Figure 1 is a diagrammatic showing of the application of this invention to a tractor and trailer, the trailer being shown slightly separated from the tractor and ready to be coupled thereto.

Figure 5 is an enlarged longitudinal part sectional elevational view of the overlapping portions of the tractor and trailer showing same in coupled relation with the control connections established and the fluid control valve open.

The present invention is herein shown as applied to a semi-trailer construction such as is illustrated and described in United States Patent 1,941,682, dated January 2nd, 1934, and United States Patent 1,995,920, dated March 26th, 1935, and in the construction shown herein, the tractor 1 is provided with a supporting base plate or bearing member 2 which carries the front end of the trailer, and is connected thereto with a swivel connection as hereinafter set forth.

Figure 1:
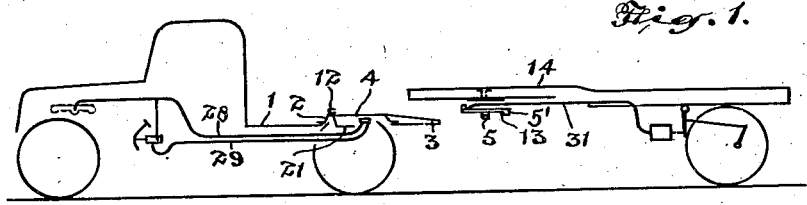
Figure 2:
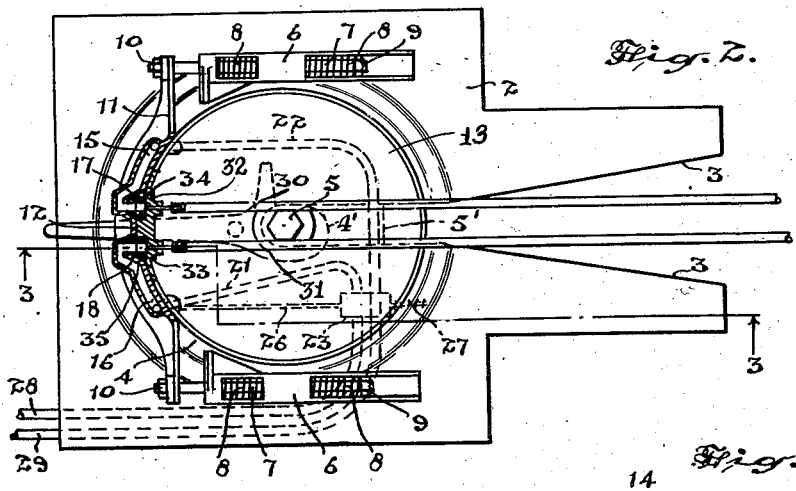
Figure 2 is an enlarged plan view in part horizontal section through the line 2—2 of Figure 3.
Figure 3:
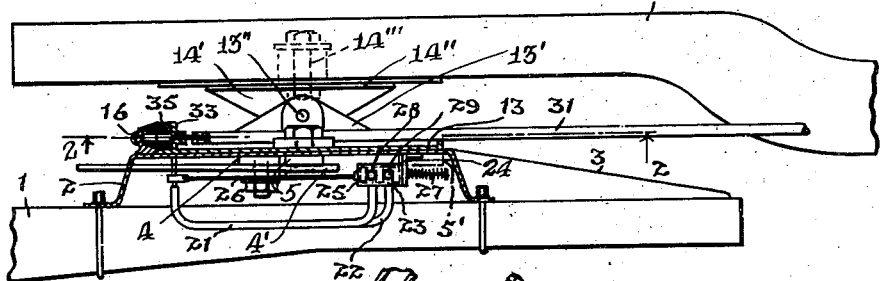
Figure 3 is an enlarged side elevational view of the structure illustrated in Figure 2 shown in part section on the line 3—3 of Figure 2.
Figure 4:
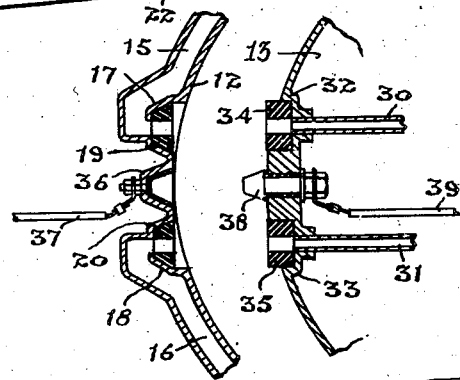
Figure 4 is an enlarged horizontal sectional detail of the mating portion of the truck and trailer units separated from each other.

The base plate 2 of the tractor member of the connection is formed with a sloping guideway 3 leading to a substantially circular flat top 4, the converging slot between the guideways being adapted to engage and guide the flanged king pin 5 to its central position, where it will be positively retained by a suitable retractable locking device as indicated in dotted lines at 4', Figure 2, such a device being shown in greater detail in the above mentioned patents. A block 5' extending from the underside of the circular plate 13 and rearwardly of the king pin 5 is adapted to also enter the converging slot and to snugly engage the side walls thereof which prevents rotation of the plate 13 on the tractor element 4.

At either side of the top plate 4 are arranged a pair of parallel brackets 6 in which bolts 7 are slidably mounted. The bolts 7 are encircled by coiled compression springs 8 held in said brackets, and adjustments of the compression of the springs may be made by means of nuts 9 threaded on said bolts.

The head ends 10 of the bolts are rigidly secured in the end of the bar 11 which extends across the plate and is formed with an arched central portion 12, the curved face of which is adapted to engage the circumference of the circular flange plate 13 of the trailer member 14.

The tension of the springs 8 holds the arched cross bar in a position to engage the periphery of the flange plate 13 as it moves inwardly into the guide considerably prior to the engagement of the king pin 5 by the fastening member 4' the king pin 5 being here shown rigidly secured to the trailer plate 13 and projecting therebelow. Consequently, as the trailer is moved into its locked position, the springs are placed under such tension as will ensure a constant pressure contact by the buffer bar. This pressure exerts a continuous backward pressure on the king pin, and any play in the king pin mechanism will be resisted by the springs 8, thus preventing rattling of the coupling, also eliminating undue thrust against the king pin, and coincidently ensuring a snug resilient contact pressure between the two engaging surfaces for the further purpose of maintaining a fluid and electrical connection, as will be hereinafter pointed out. The trailer plate 13 is here shown having upstanding side flanges 13' horizontally hinged at 13'' to downturned side flanges 14' of a bearing plate 14'' on which the trailer member 14 rests in turning contact about a vertical axis 14'''.

The bar 11 is herein shown formed with a pair of conduits 15 and 16, the inner ends of which terminate in the tapered sockets 17 and 18 respectively, and within these sockets are arranged the tapered rubber gaskets 19 and 20.

Pipes 21 and 22 connect the conduits 15 and 16 respectively with a valve casing 23 supported by a bracket 24 beneath the flange plate 13 and a piston valve 25 is arranged within this valve casing and is adapted to control the ports of the valve casing leading to the pipes 21 and 22 respectively.

A rod 26 extending through and secured to the piston valve is connected to the pipe 21 entering the bar 11, so that when the trailer is disconnected and the flange member 13 is withdrawn from engagement with the bar 11, the movement of the bar 11 actuated by the spring 8 moves the rod 26 longitudinally to operate the valve to close the ports. A coil spring 27 is mounted on the end of the rod 26.

Pipes 28 and 29 connected to the vacuum or fluid braking system of the tractor are connected to the valve casing 23 opposite to the connection of the pipes 21 and 22 therein.

It will be readily understood that the operation of the piston valve effectively shuts off communication of the conduits 15 and 16 in the bar 11 when the trailer is disconnected from the tractor and that the valve will be moved to its opening position on the coupling of the tractor and trailer.

The braking mechanism of the trailer has connected therewith a pair of pipes 30 and 31 which lead to a pair of cylindrical sockets 32 and 33 formed in the circular face of the member 13 which engages the bar 11. These sockets are aligned with the tapered sockets 17 and 18 and have mounted therein the circular rubber gaskets 34 and 35 which are adapted to enter said tapering sockets and engage the gaskets 19 and 20 and a compression joint is formed between the two pairs of gaskets which will be air tight, and by reason of the constant spring tension on the bar 11 these gaskets will remain in sealed contact throughout the operation of the vehicle when the tractor and trailer are coupled.

It will also be readily understood that the coupling of the fluid connection is entirely automatic, since when the trailer is moved into position to be coupled with the tractor, the buffer bar engages the flange plate 13, making the fluid connection in the act of coupling while concurrently therewith the valve 25 will be moved to its open position.

The bar 11 is provided with a socket 36 midway between the inner ends of the conduits 15 and 16. This socket is tapered and within it is arranged an electrical conductor member which is insulated therefrom and is connected with the electric conduit 37 leading to the electric supply system in the tractor.

The flange plate 13 of the trailer has secured therein midway between the sockets 32 and 33, an electrical connection plug 38 provided with a tapered end adapted to enter the socket 36. This plug is insulated from the member 13 and is connected to the wire conduit 39 leading to the electrical equipment of the trailer.

It will be understood that as the coupling of the tractor and trailer is made the plug 38 enters the socket 36 making an electrical connection automatically concurrently with the connection of the fluid braking system.

The device is extremely simple, but very positive and effective in operation, and it will be readily appreciated that it is entirely automatic and requires no attention on the part of the operator of the vehicle.

It must be understood that electrical connections could be substituted in place of the fluid connector elements, where it is desired to use some form of electric brake in which an electric current actuates on solenoids or magnets in the rear wheels of the trailer so as to cause the brake to be applied.

What we claim as our invention is:—

1. In a tractor and trailer, said tractor having a bearing plate, a spring-cushioned buffer bar extending transversely of the tractor above the bearing plate and mounted for fore and aft cushioned displacement, a bearing plate mounted on the trailer and engaging said buffer bar to tension the spring means thereof as said plates move into coupling relation, means for locking said plates in tractor and trailer coupling relation, and control systems carried respectively by the tractor and trailer to be connected and disconnected on the coupling and uncoupling of the tractor and trailer; detachable connection means forming terminals of said respective systems fixedly mounted respectively on said spring-mounted buffer bar and said trailer bearing plate and engageable to connect said respective systems only on the displacement of said buffer bar whereby the tension set up in the spring cushioning means thereof serves to resiliently hold said detachable means in connecting relation.

2. Means as claimed in claim 1 in which said trailer plate is horizontally and vertically pivoted on the trailer and the means for locking the respective plates in coupling relation includes a king pin member projecting downwardly from the trailer plate into a longitudinally disposed slot in the tractor plate to be engaged by a locking member and said trailer plate also carries a downwardly extending locking projection spaced rearwardly from the king pin and accommodated in said slot to lock the respective plates against relative rotation in their coupled relation and ensure registration of the respective detachable connection means of the tractor and trailer.

3. Means as claimed in claim 1 in which said connection means includes fluid coupling means mounted in part on said buffer bar and in part on the bearing member of the trailer, said buffer bar being mounted for sliding spring cushioned fore and aft displacement only on the tractor bearing member, valve means separate from said fluid coupling means for controlling the supply of fluid to said buffer-carried fluid coupling means, and means for operating said valve means in accordance with the position of said buffer bar on the tractor bearing member.

4. Means as claimed in claim 1 in which said connection means includes fluid coupling means mounted in part on said buffer bar and in part on the bearing member of the trailer, said buffer bar being mounted for sliding spring cushioned fore and after displacement only on the tractor bearing member, valve means separate from said fluid coupling means for controlling the supply of fluid to said buffer-carried fluid coupling means, and means for operating said valve means in accordance with the position of said buffer bar on the tractor bearing member, said valve means being mounted in a protected position below said tractor plate and having an operating control connection operatively connected with said buffer bar.

WILLIAM S. GURTON.
JOSEPH PLINT.
HERMAN NYBERG.